United States Patent
Alexandre et al.

(10) Patent No.: US 10,443,578 B2
(45) Date of Patent: Oct. 15, 2019

(54) WIND TURBINE HAVING AN IDENTITY MARKER ARRANGEMENT

(71) Applicant: MHI Vestas Offshore Wind A/S, Aarhus N (DK)

(72) Inventors: Matthieu Alexandre, Århus N (DK); Torben Møller Hansen, Hornslet (DK); Karl Axel Pétursson, Hadsten (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 15/576,318

(22) PCT Filed: May 31, 2016

(86) PCT No.: PCT/DK2016/050158
§ 371 (c)(1),
(2) Date: Nov. 22, 2017

(87) PCT Pub. No.: WO2016/198073
PCT Pub. Date: Dec. 15, 2016

(65) Prior Publication Data
US 2018/0156201 A1   Jun. 7, 2018

(30) Foreign Application Priority Data

Jun. 12, 2015 (DK) .................................. 2015 70365

(51) Int. Cl.
*G09F 9/302* (2006.01)
*F03D 80/10* (2016.01)
*F03D 80/00* (2016.01)

(52) U.S. Cl.
CPC ............. *F03D 80/10* (2016.05); *F03D 80/00* (2016.05); *G09F 9/302* (2013.01);
(Continued)

(58) Field of Classification Search
CPC .................................. F03D 80/10; G09F 9/302
(Continued)

(56) References Cited

U.S. PATENT DOCUMENTS 4,165,576 A * 8/1979 Joselevich ................ G09F 7/02
40/452
4,507,888 A * 4/1985 Robinson .................. G09F 7/04
40/447
(Continued)

FOREIGN PATENT DOCUMENTS

CN       104981746 A      10/2015
DE       20008533 U1      9/2001
(Continued)

OTHER PUBLICATIONS

Elsevier Ltd. et al., Siemens signs long-term service extension for Rhyl Flats Offshore Wind Farm in North Wales—Renewable Energy Focus, Renewable energy focus.com, XP055296845, Mar. 27, 2015, Retrieved from the Internet: URL:http://www.renewableenergyfocus.com/view/41828/siemens-signs-long-term-service-extension-for-rhyl-flats-offshore-wind-farm-in-north-wales/ [retrieved on Aug. 22, 2016].

(Continued)

*Primary Examiner* — Joanne Silbermann
(74) *Attorney, Agent, or Firm* — Wood Herron & Evans LLP

(57) ABSTRACT

A wind turbine ID marker arrangement to enable a wind turbine installation to be identified from the air, the ID marker arrangement comprising a display surface to which a pattern of tiles are removably attached.

17 Claims, 5 Drawing Sheets

(52) U.S. Cl.
CPC ....... *F05B 2220/25* (2013.01); *F05B 2240/14* (2013.01); *F05B 2240/99* (2013.01); *Y02B 10/30* (2013.01); *Y02E 10/726* (2013.01)

(58) Field of Classification Search
USPC .................... 40/217, 447, 595, 620; 434/171
See application file for complete search history.

(56) References Cited

U.S. PATENT DOCUMENTS

| | | | | |
|---|---|---|---|---|
| 6,021,593 | A | * | 2/2000 | Hite .................... G09F 15/0012 40/595 |
| 6,212,807 | B1 | * | 4/2001 | Wright ..................... G09F 7/12 40/450 |
| 2005/0249595 | A1 | * | 11/2005 | Wobben .................. F03D 80/10 416/132 B |
| 2013/0101417 | A1 | * | 4/2013 | Cloninger, II .......... F03D 1/065 416/61 |

FOREIGN PATENT DOCUMENTS

| | | |
|---|---|---|
| DE | 202011001338 U1 | 5/2011 |
| EP | 1154155 A2 | 11/2001 |
| EP | 2063112 A2 | 5/2009 |
| GB | 2465161 A | 5/2010 |
| JP | H11202821 A | 7/1999 |
| WO | 2014124680 A1 | 8/2014 |

OTHER PUBLICATIONS

European Patent Office, International Search Report and Written Opinion in PCT/DK2016/050158, dated Aug. 30, 2016.
Danish Patent and Trademark Office, Examination and Search Report in PA 2015 70365, dated Feb. 23, 2016.
China National Intellectual Property Administration, First Notification of Office Action in CN Application No. 201680033871.0, dated Nov. 29, 2018.
China National Intellectual Property Administration, 2nd Notification of Office Action in CN Application No. 201680033871.0, dated May 28, 2019.
Korean Intellectual Property Office, Notice of Non-Final Rejection in KR Application No. 10-2018-7001218, dated Apr. 23, 2019.

* cited by examiner

WIND TURBINE HAVING AN IDENTITY MARKER ARRANGEMENT

TECHNICAL FIELD

The invention relates to an identity marker arrangement that is particularly, though not exclusively, suited to use on a nacelle of a wind turbine.

BACKGROUND TO THE INVENTION

Commercial scale wind turbines are usually grouped together into wind turbine arrays, which are also referred to as a wind farms or wind parks. This enables the wind park operator to take advantage of economies of scale for installation and maintenance purposes, for example.

The nacelles of wind turbines are sometimes accessed by helicopter in order for maintenance to be carried out. This is particularly the case in offshore wind parks in which aerial access is much more cost-effective since maintenance personnel can be delivered to a specific wind turbine with suitable tools and components at a relatively low cost.

In order for maintenance personnel to be delivered to the correct wind turbine, it is of course necessary for wind turbines to be identifiable from the air. Therefore, it is known for the nacelles of wind turbines to be fitted with an ID plate which displays a suitable ID mark in large-enough characters so that it can be read at a distance by aircrew.

However, a drawback of this approach to marking a nacelle is that the ID plates are typically large and unwieldy items that are difficult to fit in the gusty conditions common to wind turbine sites, so it is usually preferable to fit them prior to installation. However, it may be the case that the individual wind turbines of a wind park are allocated identification numbers only after the wind turbines have been installed, for example during a commissioning exercise. It will be appreciated therefore, that it may not be practical to install ID plates on nacelles at this point. So a solution is required to enable identification numbers to be applied to wind turbines after commissioning but in a way that is practical in the extreme weather conditions usually encountered at nacelle-height.

It is against this background that the invention has been devised.

SUMMARY OF THE INVENTION

In a first aspect, embodiments of the invention provide a wind turbine ID marker arrangement to enable a wind turbine installation to be identified from the air, the ID marker arrangement comprising a display surface to which a pattern of tiles are removably attached.

A benefit of the invention is that since the tiles are small and portable, the tiles can be configured into a recognisable pattern, for example an alphanumeric character or, indeed, a plurality of such characters, easily by maintenance personnel after the wind turbine has been erected on site. Advantageously, the tiles are removably attached to the display surface in a way which is non-penetrative, as would be the case of fasteners such as bolts. This avoid the need for fixing holes in the display surface holes which, in the context of a wind turbine nacelle, for example, would not be desirable since they would potentially weaken its structure, would possibly also allow salt-laden air into the interior of the nacelle, and would also compromise the environmental control within the nacelle.

Although in principle the invention could be used to configure the pattern of tiles into any chosen shape, it is envisaged that the pattern of tiles will be configurable to display an ID character, e.g. an alphanumeric character Various fastening means may be provided to removably attach the tiles onto the display surface. Preferably, the fastening means does not require penetration of the underlying display surface, which means that the structural integrity of the display surface is unaffected. One example of such a fastening means is an adhesive.

If the pattern of tiles is configured in an additive process in which selected tiles are attached to the display surface so as to define a character, the fastening means could be a non-removable adhesive which sticks securely once the tiles are applied to the display surface. Alternatively, a removable adhesive would be appropriate where the pattern of tiles is configured in a subtractive process in which selected tiles are removed from an array of tiles attached to the display surface so as to leave a character on the display surface.

A mechanical fastening system, such as a hook and loop fastening system, may be used instead of an adhesive.

In order to maximise the visibility of the pattern, the tiles may be coloured so as to contrast with the display surface that acts as a backdrop for the tiles. A high degree of contrast may be preferable to maximise visibility in poor conditions.

In the above embodiments, the display surface may be any outward facing surface of a wind turbine installation such as the tower or the nacelle, or any other ancillary structure of the wind turbine such as foundation, in the context of an offshore installation. Accordingly, the invention extends to a wind turbine component including an ID marker arrangement. Furthermore, the invention covers ID marker arrangement applied to other parts of the installation such as electrical substations and building that contain electrical equipment.

In another aspect, the invention resides in a method of providing a visual ID marker arrangement on a wind turbine installation, comprising providing a display surface associated with the wind turbine installation, the display surface carrying a plurality of tiles arranged in an array; and removing selected ones of the plurality of tiles from the array in order to form a pattern of a recognisable character.

Conversely, in another aspect, the invention resides in a method of providing a visual ID marker arrangement on a wind turbine installation, comprising providing a display surface associated with the wind turbine installation; and attaching a plurality of tiles onto the display surface to form a pattern of tiles in the shape of a recognisable character.

BRIEF DESCRIPTION OF THE DRAWINGS

So that it may be more fully understood, the invention will now be described by way of example only to the following drawings, in which.

DETAILED DESCRIPTION OF EMBODIMENTS OF THE INVENTION

There is a need for wind turbine installations to be identifiable from the air. Primarily, this is so that aircrew on board helicopters are able to identify individual wind turbine installations out of the many that typically make up a wind park.

Up to now, this requirement has been satisfied by the use of ID plates that are secured onto the nacelle of a particular wind turbine. Such an ID plate will typically display any suitable ID scheme that is required to identify the particular turbine to which it is attached, such ID schemes being proprietary to the manufacturer of the wind turbine. The blustery conditions prevalent at wind turbine sites, however, make these ID plates difficult to retrofit to a wind turbine after installation.

The invention provides a solution to this issue, in the form of a configurable ID marker that can be configured after the wind turbine has been installed.

The marking arrangement takes the form of elements or tiles that are arranged in an array on a display surface of the wind turbine the array being configurable so that the elements are formed into a pattern defining a recognisable character, insignia or indicia. Preferably the display surface is an upper surface of a nacelle of a wind turbine.

Figure 1:
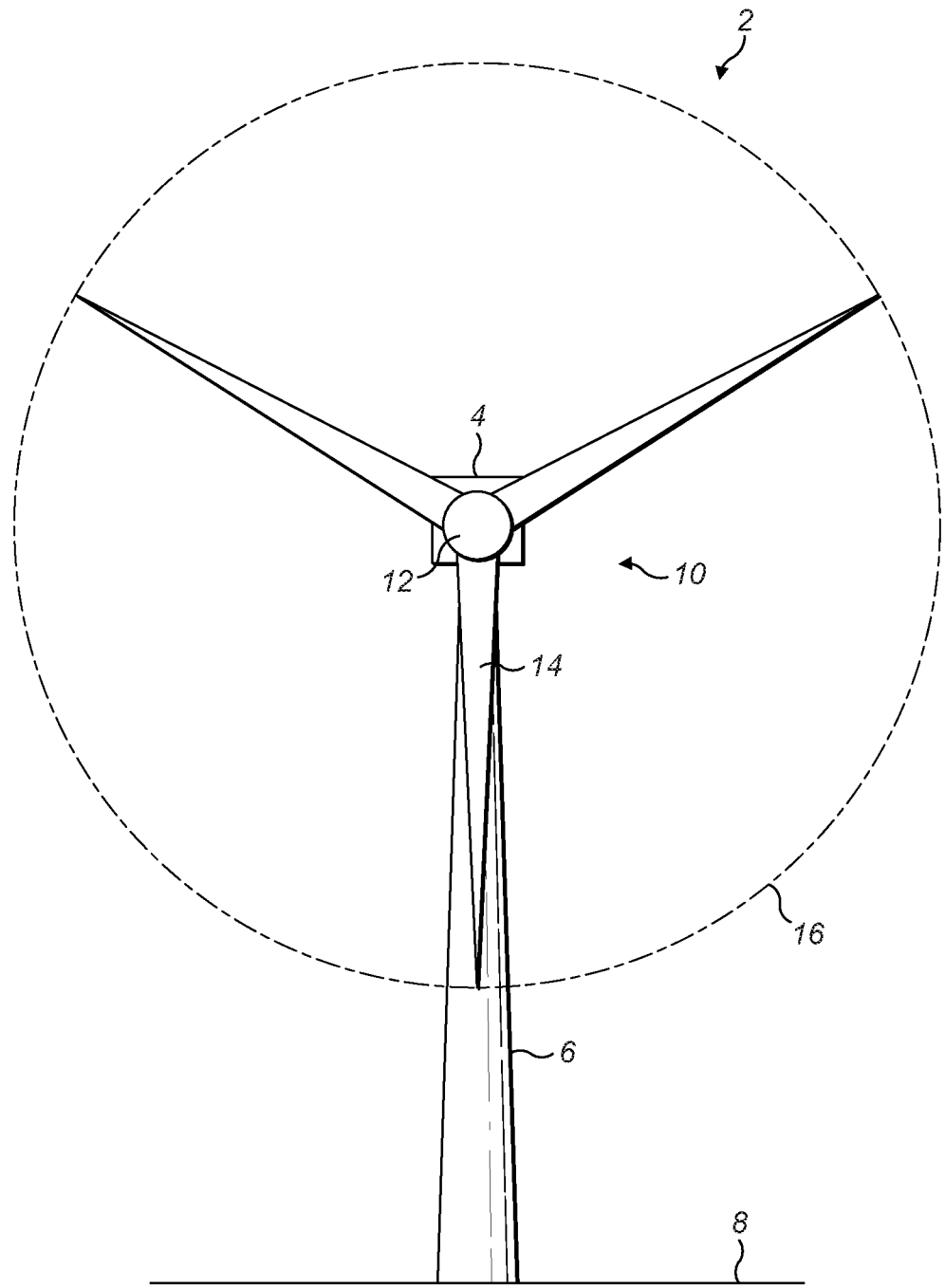
FIG. 1 is a front view of a wind turbine installation.
Figure 2:
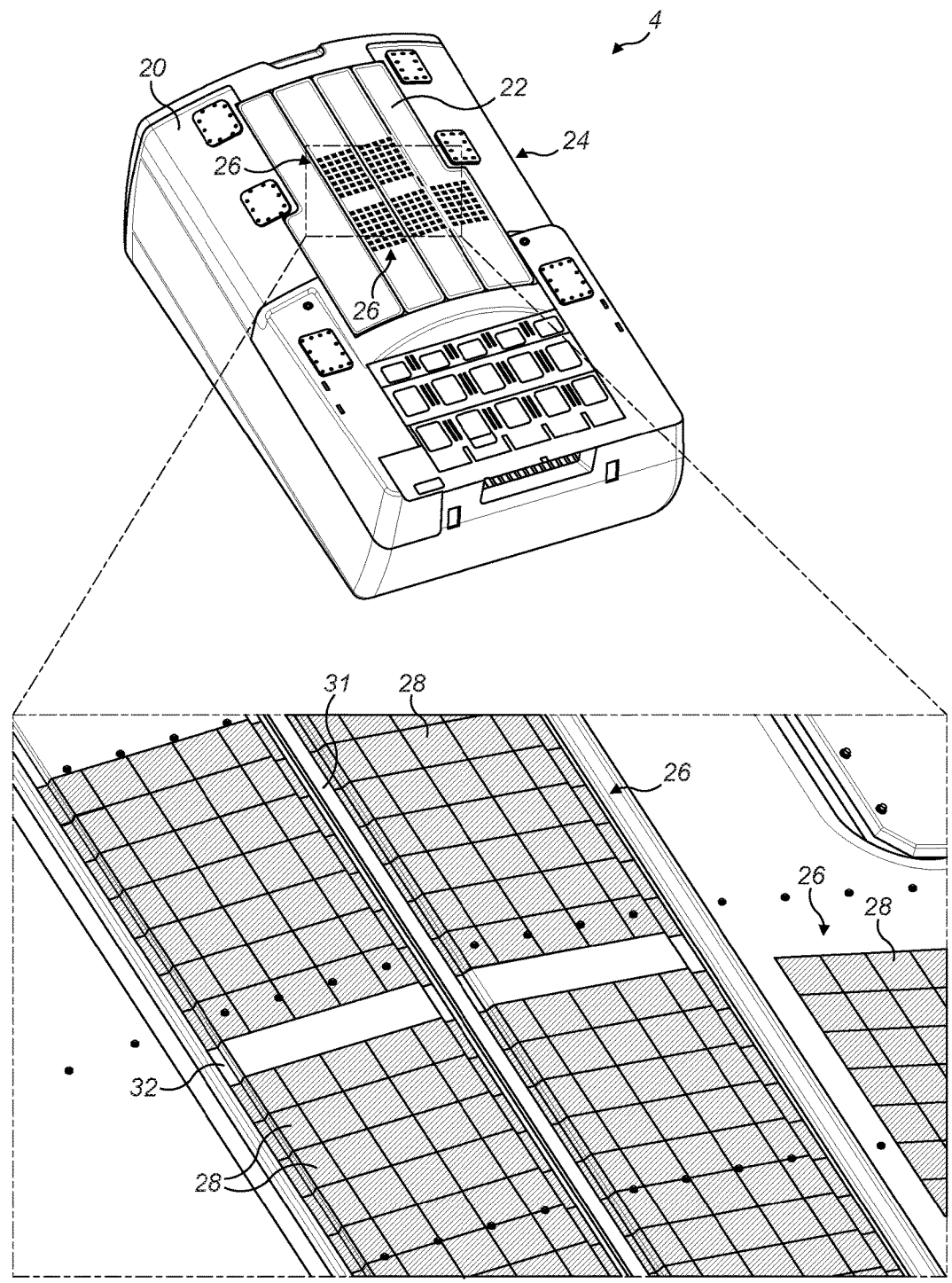
FIG. 2 is a perspective view of the nacelle of the wind turbine installation of FIG. 1, which shows an ID marker arrangement in accordance with an embodiment of the invention.

With reference to FIG. 1, a wind turbine installation 2 includes a wind turbine nacelle or 'module' 4 mounted on top of a tower 6 which is itself fixed into a foundation 8 in the usual manner. The wind turbine module 4 houses and supports the various power generating components of the wind turbine installation 2, one of which is a rotor 10 comprising a hub 12 and three blades 14 that define a rotor disc 16. The wind turbine installation shown in FIG. 2 is a horizontal axis wind turbine (HAWT) which is a common type of system, although other types exist, to which the invention is also applicable. As is known, the flow of wind acting on the blades 14 spins the rotor 10 which drives the power generation equipment housed in the wind turbine module 4.

The wind turbine module 4 is shown in more detail in FIG. 2, in which a region is shown enlarged in the inset panel. It should be appreciated that in this view, the wind turbine module 4 is shown without the rotor 10 attached to it, so as not to obscure necessary detail. From now on, the wind turbine module 4 will be referred to as the nacelle.

The nacelle 4 is box-like in form and is generally rectangular in plan profile. This provides the nacelle 4 with a large upper surface or 'roof' 20 which acts as a display surface 22.

The display surface 22 carries an ID marker arrangement 24 which is configurable to display one or more alphanumeric characters in a colour that contrasts with the surrounding region of the display surface 22 that provides a backdrop so that the ID marker arrangement 24 can be seen clearly from the air.

In this embodiment, the ID marker arrangement 24 includes five character arrays 26, although the invention is applicable to a single character array carried on the display surface 22. Only two of the five character arrays 26 are labelled on FIG. 2 for clarity. Each of the character arrays 26 comprises an array of elements 28 that are arranged in rows and columns to form the array 26 which is rectangular in shape, in this embodiment. As will be explained, each of the elements 28 is flat and rectangular in form in the manner of a tile, and will be referred to as such from now on.

Figure 3:
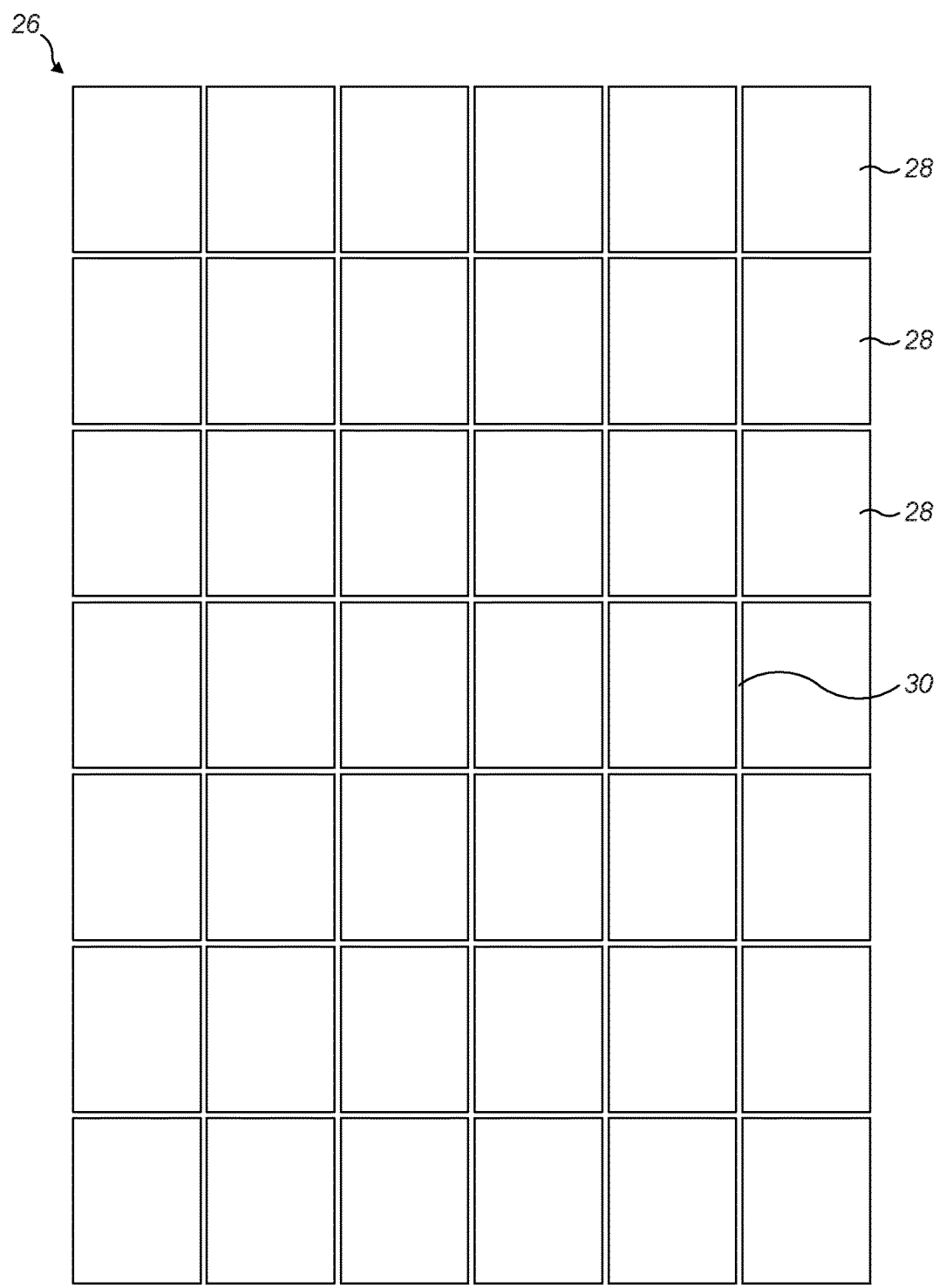
FIG. 3 is a view of a single character array of the ID marker arrangement shown in FIG. 2.

The separation between each of the tiles 28 can be seen in FIG. 2, but is shown more clearly in FIG. 3. The character array 26 in this Figure is given as an example, but it should be appreciated that other configurations would also be acceptable.

In the rectangular array 26 of FIG. 3, there are seven rows and five (7×5) columns of tiles 28, providing a total of thirty-five tiles 28. Only three tiles are labelled for clarity. Each tile 28 is approximately 18 cm in width and approximately 21 cm in height, and is separated from adjacent tiles by a 5 mm margin 30. This arrangement provides the character array with an overall dimension of approximately 1.5 m in height and 90 cm in width. As will be appreciated, each character array 26 is configurable into a pattern that defines a recognisable character, and such an array size is considered to be sufficient for the character to be discernible from the air. In this specific embodiment, the dimensions of the character array satisfy the legal requirements that the height of characters should be greater than 1.5 m, in the UK, and greater than 1.2 m, elsewhere in Europe. Notwithstanding this, it is envisaged that characters less than 1 m in height (and approximately 600 mm (0.6 m) in width) would not be practical for this purpose, and so this represents an approximate minimum height limit for a character. Thus configuring an array in a rectilinear form having seven rows and five columns provides that all letters of the alphabet and numbers through 0-9 can be accurately defined. It is envisaged that a lower 'resolution' of the character array, for example six rows by four (6×4) columns, would be acceptable, and would possibly be easier to configure into a character, although it would might negatively affect readability of those characters. Conversely, it is also envisaged that an array having a higher resolution, for example nine rows by seven (9×7) columns, would also be acceptable, and would provide a cleaner looking character, albeit at the expense of the greater time required to configure the array into the desired shape. In summary, it is considered that a 7×5 array size strikes the right compromise between these factors.

Considering the envisaged minimum height limit for the characters of approximately 1 mm, and the envisaged maximum practical resolution (9×7) for the character arrays, this would provide a minimum height for a tile of approximately 11 cm (110 mm) and a minimum width of approximately 0.85 cm (85 mm).

In this embodiment, the tiles 28 are formed from a suitable polymeric material such as vinyl or polyurethane (PU). Each tile 28 is provided with a coloured upper surface so as to contrast with the display surface 22 of the nacelle 4. On their bottom surface, the tiles 28 carry an adhesive layer, so that each tile 28 is like a sticker. As an alternative to adhesive, it is envisaged that other means could be used, such as a hook and loop fastening system, either applied to the entirety of the reverse side of the tile 28, or in discrete patches. A heavy duty type system would be preferred due to the environmental conditions in which it would be expected to perform.

The tiles 28 may be applied to the display surface 22 individually during the manufacture of the nacelle 4. Alternatively, it is envisaged that the character array 26 could be applied as a single sticker-like unit in which the tiles 28 are provided as pre-cut forms which could then be removed as needed. This would simplify procedure of applying the character array 26 to the display surface 22. In such a unit, the individual tiles 28 could be delimited by suitable lines of weakness, for example lines of perforations, score lines and the like, which would enable selected tiles 28 to be separated out of the unit.

The tile 28 is flexible so that it can be laid on the display surface and pressed into position so that the adhesive fixes the tile 28 in place. As can be seen in FIG. 2, the display surface 22 is generally flat, but has a degree of curvature, particularly across the width of the surface. Therefore, the flexibility of the tiles 28 allow them to conform to the underlying profile of the display surface 22, thereby accommodating any ridges 31 or troughs 32 in the surface, as shown in FIG. 2 by way of example. It will be appreciated that if the display surface 22 was completely flat, then it would be acceptable for the tiles 28 to be substantially rigid, and therefore made out of a suitable rigid polymer such as polycarbonate (PC) or polypropylene (PP). In such a case, it is envisaged that the tiles 28 being rigid, could form part of a larger panel (not shown) defining the character array 26, each tile 28 being separable from the panel, without damaging its adjacent tiles 28.

Figure 3A:
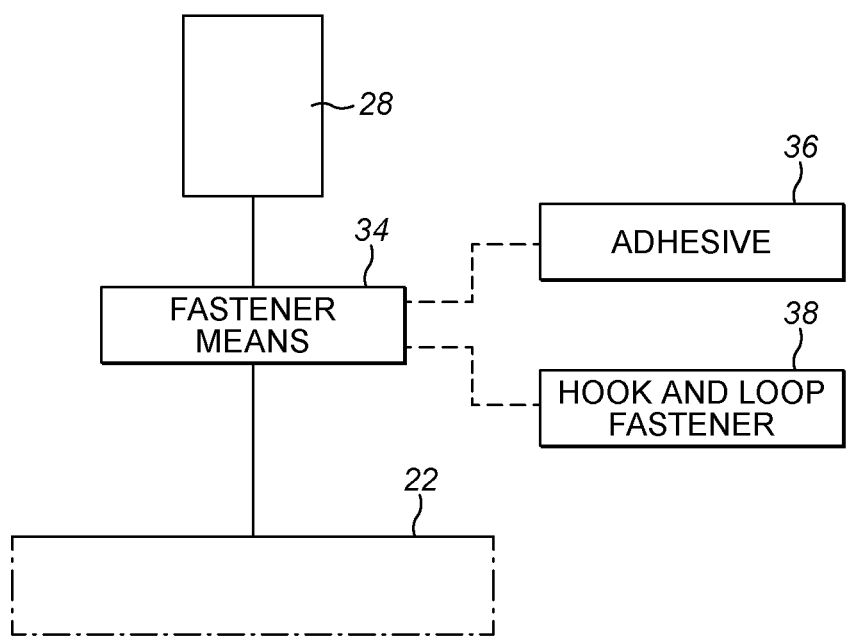
FIG. 3A is a schematic view illustrating the attachment of a tile to the display surface in accordance with various embodiments.

Although it is envisaged that the tiles 28 will be secured to the display surface 22 by way of an adhesive, embodiments are envisaged in which another form of temporary fixing will be used. For example, the tiles 28 could be secured to the display surface 22 by way of releasably lockable mechanical fasteners such as quick-release latch pins, push pins or poppers, or even a hook and loop fastening arrangement. In this regard, FIG. 3A schematically illustrates the attachment of a tile 28 to the display surface 22. The tile 28 may be secured by a fastening means 34. As noted above, the fastening means 34 may be an adhesive 36 or a mechanical fastening system, such as a hook and loop fastener 38. It should be noted that all of these means of fastening the tiles 28 to the display surface 22 are non-penetrative, as would be the case of fasteners such as bolts. To use such penetrative fasteners, many holes would need to be formed into the display surface 22 to allow all of the tiles 28 to be fixed to it. Such holes would not be desirable since they would potentially weaken the structure of the display surface 22, but would also act as an ingress point to the outside environment, thus allowing salt-laden air into the interior of the nacelle.

Since the tiles 28 are removable from the display surface 22, selected ones of the tiles 28 may be removed by maintenance personnel so that the remaining tiles form a recognisable distinguishing pattern, mark, insignia or indicia. In theory, the mark may be anything that enables the wind turbine to be distinguished from other wind turbines, although it is envisaged that alphanumeric characters are most suitable.

Figure 4:
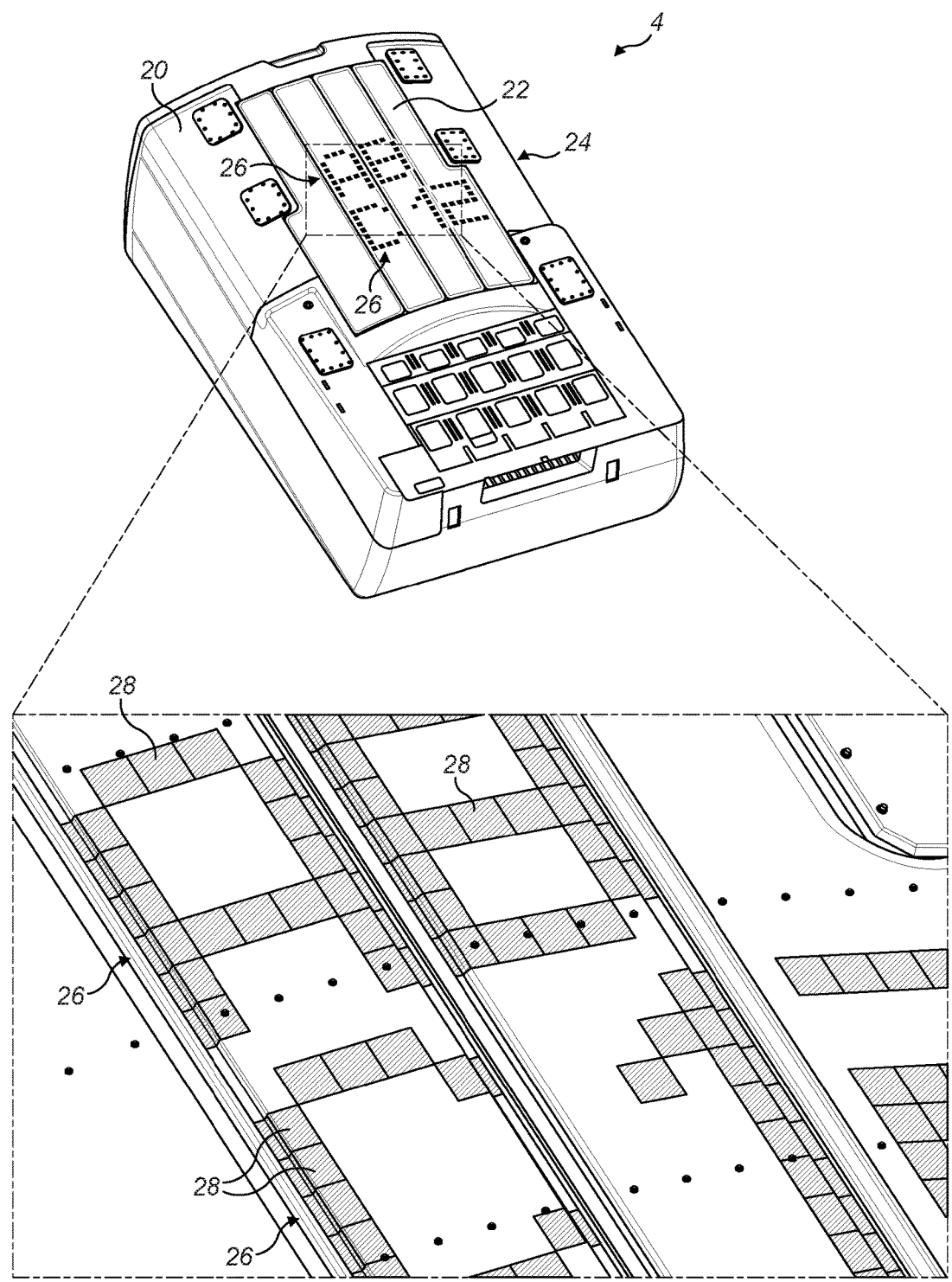
FIG. 4 is a perspective view like that in FIG. 2, but which show the ID marker arrangement configured to display an identity number.

With this in mind, reference is made to FIG. 4, in which it can be seen that each of the character arrays 26 has been configured to result in a string of recognisable alphanumeric characters so as to define a wind turbine ID number, which in this example is "ABC12".

In the embodiments described above, the process of configuring the character arrays 26 is essentially 'subtractive', in that selected tiles 28 are removed from the arrays in order to leave behind a pattern forming a recognisable character. This confers some advantages; for instance the maintenance personnel would simply have to remove the pre-selected tiles and discard them in some way. A container could, for example, be located on the nacelle 4, in which the tiles 28 could be placed once they have been removed from the display surface 22. The tiles 28 could then be reused in the event that the character array 26 needed to be reconfigured. The maintenance personnel do not, therefore, need to carry away with them any of the tiles 28 and they could be left on the nacelle 4, suitably contained in appropriate weatherproof environment.

However, it is envisaged that the invention could also be embodied in an 'additive' process in which tiles are fixed to a predetermined grid, pattern or 'blank' array in order to build up the required character. One potential downside of this approach is that potentially a large number of tiles 28 would have to be carried onto the nacelle 4 in order to configure the character array with the required character. However, this issue could be resolved by providing a store of tiles 28 on or in the nacelle 4 in a suitable container ready to be applied by maintenance personnel. In such an additive tile configuration, the means by which the tiles 28 are fastened to the display surface 22 may be permanent, for example an adhesive that provides a permanent bond, rather than a releasable one, or mechanical fasteners such as snap fixings or rivets which provide a non-releasable fixing. In the above description, it will be appreciated therefore that the term 'array' shall be considered to mean the plurality of tiles 28 arranged in rows and columns, e.g. as in FIG. 2, from which selected tiles may be removed to form a character, but also to the configuration of tiles that define the character, either by way of a subtractive process or an additive process, as has been described here.

In the above embodiments, the tiles 28 have been described as generally flat rectangular elements that can be removed from or applied to the character array. It should be noted that this configuration of tile 28 is provided by way of example only, and that other forms are envisaged. For example, the tiles 28 could be non-rectangular shapes, such as circular tiles.

Also, the tiles 28 need not be flat. For instance, the tiles could be shaped with a suitable form which would allow them to fit onto a complementary form defined on the display surface. One way of doing this would be to provide the underside of the tile with one or more protrusions, nodes, ridges or other form of locating feature that would mate with a suitable inverse mating feature provided on or defined by the display surface. Those locating features could interlock, either permanently or releasably, to hold the tiles 28 in place.

Some alternative embodiments have been explained above. However, the skilled person would understand that further variations and modifications may be made to the embodiments without going beyond the scope of the invention as defined by the claims, some example of which will now be explained.

Although in the embodiments described above, the ID marker arrangement was defined on a display surface of the nacelle, it should be noted that this is not essential and the ID marker arrangement could in principle be provided in any position where it is visible to others, preferably from the air. For example, it may be mounted on a platform or gantry associated with the nacelle, for instance a helipad or walkway. Still further, the display surface could be part of the tower itself, a suitable component associated with the tower, such as a maintenance platform, or the display surface could be part of a foundation of the wind turbine installation, for example a 'jacket' or 'tripod' foundation in an offshore wind turbine installation. Still further the display surface could be part of a component unrelated to the wind turbine, for example it could be part of a housing for a transformer station or met station in a wind park.

In all of these variants, the display surface can be considered to be provided on a wind turbine component, whether or not it is part of the nacelle or tower explicitly.

The invention claimed is:

1. A wind turbine installation, comprising:
    a tower;
    a nacelle coupled to the tower;
    a rotor having a hub and one or more blades; and
    an ID marker arrangement on the nacelle to enable the wind turbine installation to be identified from the air, the ID marker arrangement comprising:
        a display surface formed by an outer surface of the nacelle; and
        one or more character arrays on the display surface, each of the one or more character arrays including a pattern of tiles removably attached to the display surface, wherein each of the tiles in the pattern of tiles is attached directly to the outer surface of the nacelle that forms the display surface.

2. The wind turbine installation of claim 1, wherein the pattern of tiles are removably attached to the display surface by a fastening means.

3. The wind turbine installation of claim 2, wherein the fastening means is an adhesive.

4. The wind turbine installation of claim 2, wherein the fastening means is a mechanical fastening system.

5. The wind turbine installation of claim 4, wherein the mechanical fastening system is a hook and loop fastening system.

6. The wind turbine installation of claim 1, wherein the tiles are coloured so as to contrast with the display surface that acts as a backdrop for the tiles.

7. The wind turbine installation of claim 1, wherein the pattern of tiles is configurable to display an ID character.

8. The wind turbine installation of claim 7, wherein the pattern of tiles is configurable in a subtractive process in which selected tiles are removed from the one or more character arrays on the display surface so as to leave a character on the display surface.

9. The wind turbine installation of claim 7, wherein the pattern of tiles is configurable in an additive process in which selected tiles are attached to the display surface so as to define a character.

10. The wind turbine installation of claim 7, wherein the character defines a minimum character height of 1000 mm.

11. The wind turbine installation of claim 7, wherein the tiles have a minimum tile height of 110 mm.

12. The wind turbine installation of claim 1, wherein the one or more character array is a rectilinear array having an array size between 6 rows by 4 columns and 9 rows by 7 columns.

13. The wind turbine installation of claim 1, including a plurality of character arrays on the display surface.

14. The wind turbine installation of claim 1, wherein the display surface is provided by an upper surface of the nacelle.

15. The wind turbine installation of claim 1, wherein each character array is rectilinear having the tiles arranged in a plurality of rows and a plurality of columns, and wherein each tile is separated from an adjacent tile by a margin.

16. The wind turbine installation of claim 15, wherein the tiles are flat and rectangular in form.

17. The wind turbine installation of claim 16, wherein the tiles are flexible.

* * * * *